United States Patent [19]

Kawahara et al.

[11] Patent Number: 5,206,673
[45] Date of Patent: Apr. 27, 1993

[54] REFLECTION TYPE OVERHEAD PROJECTOR

[75] Inventors: Yukio Kawahara; Keiichi Mori; Akihiro Homma; Toshiya Isobe; Mitsugi Kajikawa; Toshihiro Yonemitsu, all of Tokyo, Japan

[73] Assignee: Japan Aviation Electronics Industry Limited, Tokyo, Japan

[21] Appl. No.: 733,206

[22] Filed: Jul. 19, 1991

[30] Foreign Application Priority Data

Feb. 22, 1991 [JP] Japan .................................. 3-028610
Jun. 7, 1991 [JP] Japan .................................. 3-136388
Jun. 7, 1991 [JP] Japan .................................. 3-136389

[51] Int. Cl.⁵ .............................................. G02F 1/13
[52] U.S. Cl. .................................... 353/98; 353/31; 353/122; 359/70; 359/63
[58] Field of Search ............... 353/20, 31, 37, 63, 353/64, 119, 122, DIG. 4, DIG. 3, DIG. 5, DIG. 6, 98, 69, 99, 70; 359/63, 37, 70, 74, 68

[56] References Cited

U.S. PATENT DOCUMENTS

| | | | |
|---|---|---|---|
| 4,406,530 | 9/1983 | Hasegawa et al. | 353/DIG. 4 |
| 4,818,074 | 4/1989 | Yokoi et al. | 359/63 |
| 4,921,343 | 5/1990 | Ushiro et al. | 353/DIG. 3 |
| 4,928,123 | 5/1990 | Takafuji | 353/122 |
| 4,943,156 | 7/1990 | Vanderwelf | 353/DIG. 4 |
| 4,953,971 | 9/1990 | Highfill | 353/DIG. 3 |
| 4,969,730 | 11/1990 | VanderBrandt | 353/34 |
| 4,995,718 | 2/1991 | Jachimowicz et al. | 353/31 |

FOREIGN PATENT DOCUMENTS

| | | | |
|---|---|---|---|
| 3711542 | 11/1988 | Fed. Rep. of Germany | 353/DIG. 4 |
| 0035526 | 3/1983 | Japan | 353/55 |

Primary Examiner—William A. Cuchlinski, Jr.
Assistant Examiner—William C. Dowling
Attorney, Agent, or Firm—Pollock, Vande Sande and Priddy

[57] ABSTRACT

A mirror Fresnel lens (12) is disposed on a base (11), on which a liquid crystal display (18) is mounted. The liquid crystal display (18) is provided with a polarization plate (24) only in the mirror Fresnel lens (12) side. Light from a light source (15) passes through the liquid crystal display (18), is reflected by the mirror Fresnel lens (12), again passes through the liquid crystal display (18), is converged by a projection lens 16 and reflected by the mirror (17) and eventually arrives at a screen (20). A separated polarization plate (25) is provided in a manner to overlap with the projection lens 16. The separated polarization plate (25) is paired with the polarization plate (24).

14 Claims, 17 Drawing Sheets

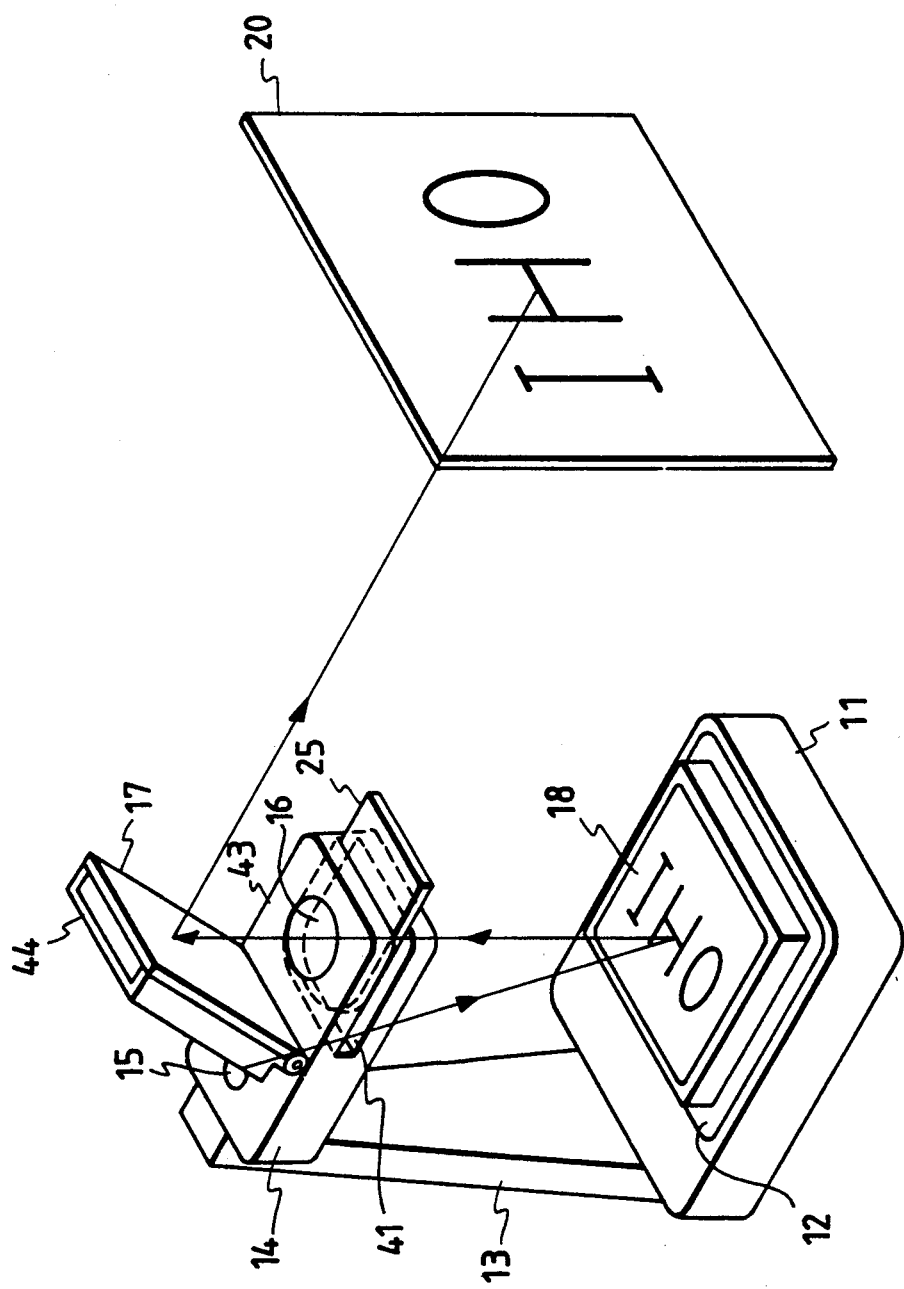

REFLECTION TYPE OVERHEAD PROJECTOR

BACKGROUND OF THE INVENTION

The present invention relates to a reflection type liquid crystal overhead projector to project a display image on a liquid crystal display into an expanded display image.

A conventional reflection type liquid crystal overhead projector comprises, as shown in FIG. 1, a base 11, a mirror Fresnel lens 12 mounted on said base 11, a supporting pole 13 fixed on said base 11, a holding portion 14 mounted in opposition to the base 11 and a light source 15, a projection lens 16 and a mirror 17 mounted on said holding portion 14, a liquid crystal display 18 disposed on said mirror Fresnel lens 12, said liquid crystal display 18 comprising a frame body 21 mounted on a peripheral portion of a liquid crystal panel 19, and a liquid crystal panel driving circuit, interface and other control circuits and a driving unit such as a power supply circuit assembled in the frame body 21. The liquid crystal panel 19 is equipped with polarization plates 23 and 24 on both surfaces of a liquid cell 22.

Light $L_1$ emitted from the light source 15 is transmitted through the liquid crystal panel 19 and then reflected by the mirror Fresnel lens 12, and the reflected light $L_2$ is transmitted again through the liquid crystal panel 19 and converged by the projection lens 16 and then reflected by the mirror 17 and projected on a screen 20. Thus, an image on the liquid crystal display 18 is displayed on the screen 20 in an enlarged manner.

A conventional system as described above suffers from a defect that a projected image is shown in double vision. That is, because of the presence of the frame body 21, etc., there inevitably is a gap between the liquid crystal panel 19 and the mirror Fresnel lens 12. Therefore, incident light $L_1$ emitted from the light source 15 and passed through a pixel Pa in the liquid crystal panel 19 may pass, as reflection light $L_2$ reflected by the mirror Fresnel lens 12, through a pixel Pb rather than the pixel Pa of the liquid crystal panel 19. Consequently, an image of the pixel Pa may be displayed on the screen 20 in superposition with an image of the pixel Pb.

In order to solve this problem, it has been proposed in the prior art, as shown in Japanese Patent Application Laid Open No. 18339/88 that the liquid crystal panel 19 be closely integrated with the mirror Fresnel lens 12 into one body. However, if such a composition is used, a conventional liquid crystal display is not used and it is not possible to dispose an image film sheet on the mirror Fresnel lens 12 and to display an image on the image film sheet onto the screen in an enlarged manner. In other words, it is not possible to use the equipment in such a manner that an image film sheet and a liquid crystal display can replace each other so that the image on either the film sheet or the liquid crystal display can be displayed in an enlarged manner.

Another problem encountered with a conventional reflection type liquid crystal overhead projector is shown in FIG. 2 where a bright spot 20b appears at a center portion within a panel projection surface 20a on the screen 20, irrespective of the original image, making it difficult to see an enlarged and projected image. As a result of investigating why such a bright spot 20b was created, it was revealed that the image of a filament, etc. of the light source 15 was reflected on the surface of the liquid crystal panel 19, converged by the projection lens 16, projected onto the screen 20 and caused a bright spot 20b.

An object of the present invention is to provide a reflection type liquid crystal overhead projector that can enlarge and display an image on a liquid crystal display without creating a double vision, and without integrating the liquid crystal panel with the mirror Fresnel lens.

Another object of the present invention is to offer a reflection type liquid crystal overhead projector that provides a projection plane with uniform illuminance, without creating any bright spot on a projection surface of the screen resulting from reflection image coming from a surface of the liquid crystal panel and the light source.

SUMMARY OF THE INVENTION

According to the present invention, with a reflection type overhead projector in which a mirror Fresnel lens reflects light from a light source, and an image on said mirror Fresnel lens is converged onto a projection lens and projected in an enlarged manner and displayed on a screen, a liquid crystal display disposed on said mirror Fresnel lens is provided with a polarization plate on only one side thereof, said polarization plate being in opposition to said mirror Fresnel lens; and a second polarization plate, spaced from said polarization plate of the liquid crystal display is provided adjacent the projection lens.

When a color liquid crystal display is used, a stripe-like color filter is used for the color liquid crystal display, and pixels of the liquid crystal panel are disposed in opposition to the stripes.

Also, when a color liquid crystal display is used, a ECB (Electrically Controlled Birefringence) type liquid crystal panel without a color filter is employed.

The aforementioned second polarization plate is made detachable and freely rotatable around a center axis of the optical axis of the projection lens. In this way, the angle between the liquid crystal display and the polarization plate is made easily adjustable.

The second polarization plate is connected mechanically to the liquid crystal display and, by setting it on the base of the liquid crystal display after the liquid crystal display is removed from the base, the second polarization plate is automatically in a predetermined relationship with the liquid crystal display.

An antireflection layer is formed on the surface of the liquid crystal panel.

The liquid crystal panel is slanted toward the mirror Fresnel lens so that an image of the light source, reflected from the surface of the liquid crystal panel, is displaced from the projection lens.

BRIEF DESCRIPTION OF THE DRAWINGS

FIG. 10 is a perspective view showing another embodiment of the present invention;

DETAILED DESCRIPTION OF THE PREFERRED EMBODIMENTS

Figure 1:
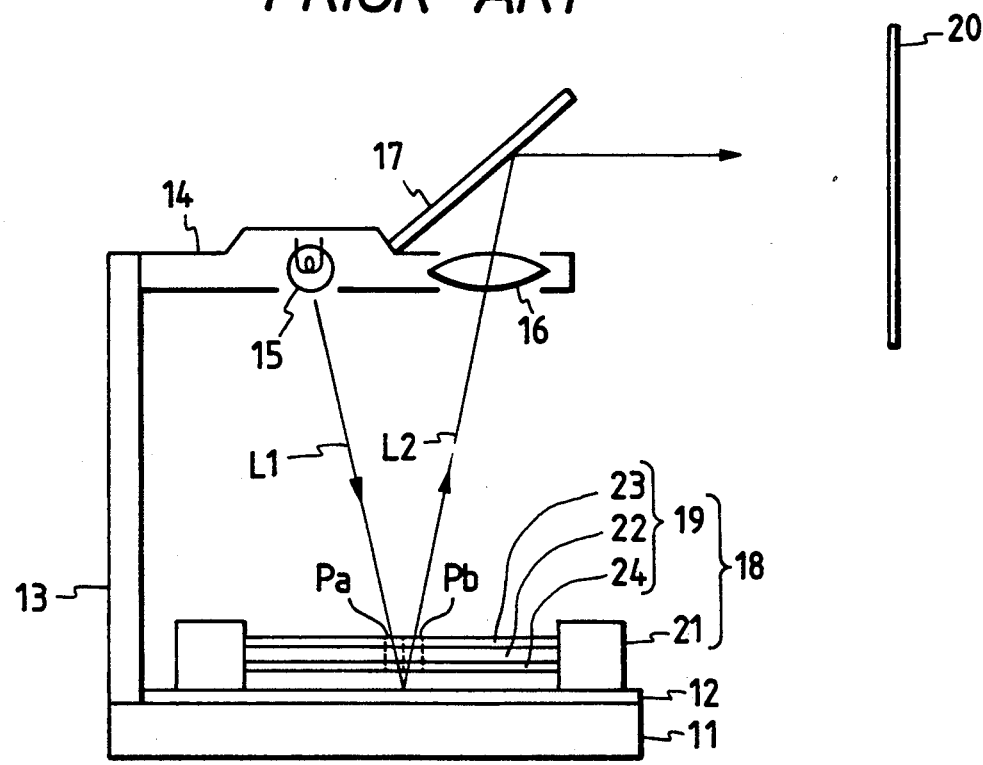
FIG. 1 is a side view showing a conventional reflection type liquid crystal overhead projector.
Figure 3:
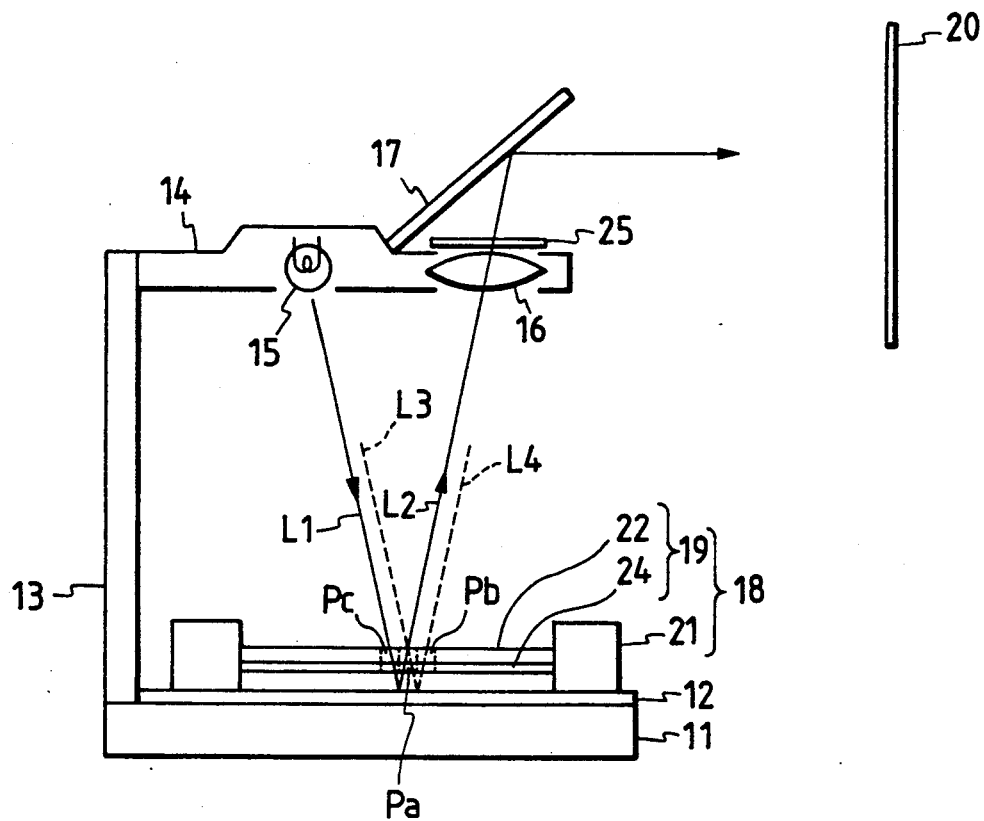
FIG. 3 is a side view of an embodiment of the present invention.

An embodiment of the present invention is shown in FIG. 3 in which parts corresponding to those in FIG. 1 are numbered with the same numerals while omitting duplicated description in the following. That is, the arrangement of FIG. 3 is substantially the same as that shown in FIG. 1 except that, according to the present invention, a polarization plate is removed one side of the liquid crystal display 18 is removed while leaving only the other polarization plate 24 which is in opposition to the mirror Fresnel lens 12. The removed polarization plate is disposed adjacent projection lens 16 as a separated polarization plate 25. In the FIG. 3 embodiment, the separated polarization plate 25 is disposed immediately above the projection lens 16. The polarization direction of the separated polarization plate 25 is made the same as the polarization direction of the polarization plate 23 in FIG. 1 which is mounted on the liquid crystal display 18. The polarization plate 25 need only be so positioned that light from the light source 15 does not directly enter the polarization plate 25 to reach the liquid crystal panel 19. Therefore, it may also be located at another suitable position besides immediately above the projection lens 16.

Incident light $L_1$ is reflected by the mirror Fresnel lens 12 and then transmitted through the polarization plate 24, a pixel Pa of the liquid crystal cell 22, and then the separated polarization plate 25. When the reflected light $L_2$ from the mirror Fresnel lens 12 passes through the polarization plate 24, the polarization direction of the light is determined by the polarization plate 24. When the light $L_2$ passes the pixel Pa of the liquid crystal cell 22, the state of polarization thereof alters according to the birefringence and orientation states of the liquid crystal at that portion of the cell. Although the polarization state of the light $L_2$ varies after it enters the liquid crystal cell 22, the intensity of the light does not change. When the light $L_2$ passes the separated polarization plate 25, the intensity of the light $L_2$ becomes different depending on the prior polarization state of the light. Thus, the incident light $L_1$ alters to reflected light $L_2$ representing the liquid crystal orientation state of the pixel Pa in the liquid crystal cell 22, and is then projected on the projection plane.

Incident light $L_3$, on the other hand, is transmitted through the pixel Pa of the liquid crystal cell 22 and the polarization plate 24. The light source 15 used for a normal reflection type overhead projector may comprise a halogen lamp for example. Light emitted from this light source 15 is randomly polarized in a so-called natural-light state. The randomly polarized light remains random in polarization even after the light is transmitted through the liquid crystal cell 22, while maintaining the light intensity unchanged. Therefore, the light $L_3$ incident to the pixel Pa keeps its random state of polarization and is unchanged in light intensity even after the light is transmitted through the liquid crystal cell 22. In addition, reflected light $L_4$ of the incident light $L_3$ does not represent the state of orientation of liquid crystals in the pixel Pa in the liquid crystal cell 22. Instead, the reflected light $L_4$ represents the state of liquid crystal orientation in the pixel Pb. In addition, it is only the state of liquid crystal orientation in the pixel Pa that is represented by the reflected light $L_2$, but the state of liquid crystal orientation in the pixel Pc is not shown in the reflected light $L_2$.

As described above, only the reflected light $L_2$ can represent the orientation status of the liquid crystal in the pixel Pa as a light intensity, though the reflected light $L_4$ is also transmitted through the pixel Pa. Consequently, a double view of a projected image never occurs.

The operation of the present invention as described above is never affected by the distance between the liquid crystal panel 19 and the mirror Fresnel lens 12. Therefore, the freedom to compose the liquid crystal panel 19 becomes larger. That is, by removing the liquid crystal display 18, the projector is also operable as a conventional reflection type overhead projector using an image film sheet. In this case, the illuminance the same as in conventional projectors provided the separated polarization plate 25 is also removed. Compared to the conventional projector shown in FIG. 1, another advantage of the novel projector is that a brighter image is projected and displayed. More explicitly, with a conventional projector, emitted light from the light source 15 passes the polarization plates a total of four times since the incident light makes a round passage through each of the two polarization plates. According to the present invention, however, light passes through the polarization plates only a total of three times. Hence, the quantity of light absorbed by the polarization plates decreases.

Even when the liquid crystal in the liquid crystal cell 22 contains a dichroic dye, it is possible to reduce double vision effects provided the projector comprises a system mainly utilizing birefringence of TN type or STN type liquid crystal added with a dye, because one of double images becomes thinner. If the dye itself is not provided with an optical anisotropy, no double vision occurs.

Figure 4A:
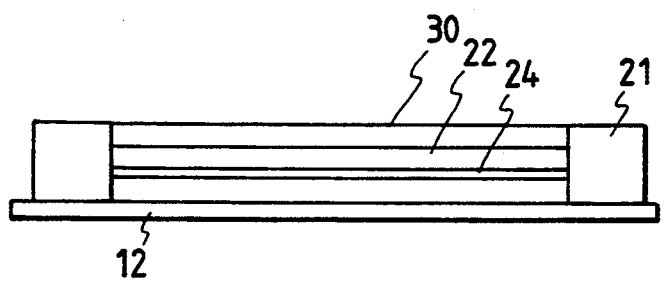
FIG. 4A is a view showing a partial modification of the liquid crystal display 18 in FIG. 3.
Figure 4B:
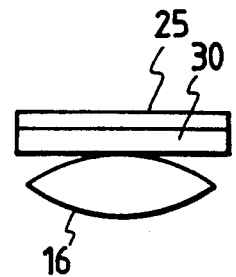
FIG. 4B is a view showing an example equipped with a phase compensation plate in a separated polarization plate.

A liquid crystal panel in which a phase compensation plate of a liquid crystal cell or a film is used in opposition to or stuck on the liquid crystal panel 19, that is so-called double STN type, may also be used. With a film used as a phase compensation plate, the system is normally called a phase film type. Also within the scope of the present invention, it is possible to mount a phase compensation plate 30 comprising a film on the liquid crystal cell 22 as shown in FIG. 4A for example. Or it is also possible to separate the phase compensation plate 30 from the liquid crystal cell 22 and mount it on the separated polarization plate 25 as shown in FIG. 4B for example. The phase compensation plate 30 may also comprise a plurality of liquid crystal cells or films.

Figure 5:
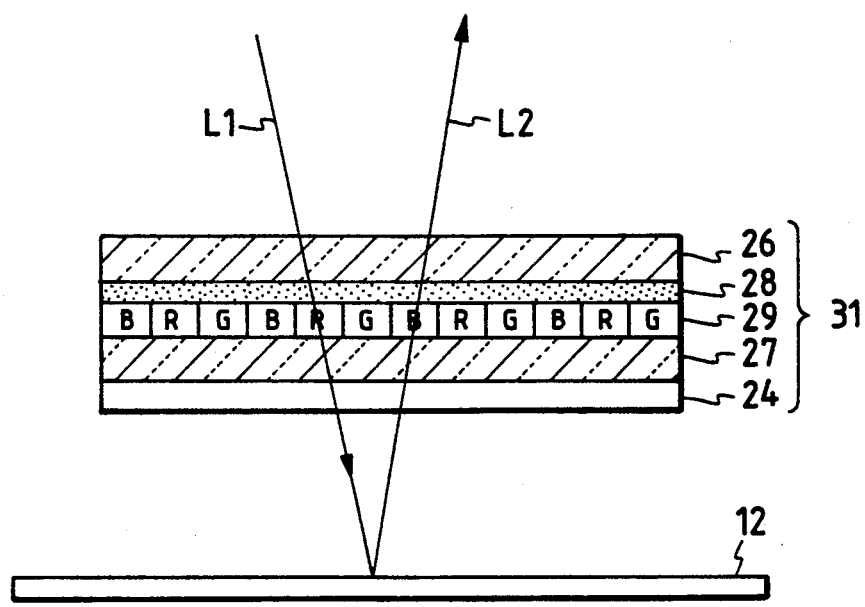
FIG. 5 is a sectional view of the liquid crystal panel to explain problems in association with the use of a color liquid crystal display in the projector of FIG. 3.

As described above, the problem of double vision associated with a reflection type liquid crystal overhead projector has been solved by separating on of the polarization plates from a conventional liquid crystal panel. This arrangement is hereinafter called a polarization plate separation system. Nevertheless, even this polarization plate separation system exhibits problems in color display. That is, the colorization of a liquid crystal display is achieved normally by adding a color filter, and a multi-color display is effected by mixing of colors. By applying the polarization plate separation system to such a color liquid crystal display, the structure becomes as shown in FIG. 5. A liquid crystal 28 is sealed between transparent substrates 26 and 27 and a color filter 29 is formed in a dot pattern inside the transparent substrate 27. The resultant liquid crystal cell 31 has a polarization plate 24 formed on the outer surface of the transparent substrate 27. The polarization plate 24 is opposed to a mirror Fresnel lens 12. In this case, incident light $L_1$ and reflected light $L_2$ thereof are transmitted through dots of different colors in the color filter 29. Therefore, the pattern of the color filter 29 is projected in duplicate. Light transmitted twice through the color filter 29 is subtractively mixed. For example, when incident light $L_1$ passes through a red dot of the color filter 29 and reflected light $L_2$ is then transmitted through a blue dot, the resultant light becomes violet. Since the blue color originally intended to be displayed is not actually displayed in this example, a satisfactory color display is obtainable.

Figure 6:
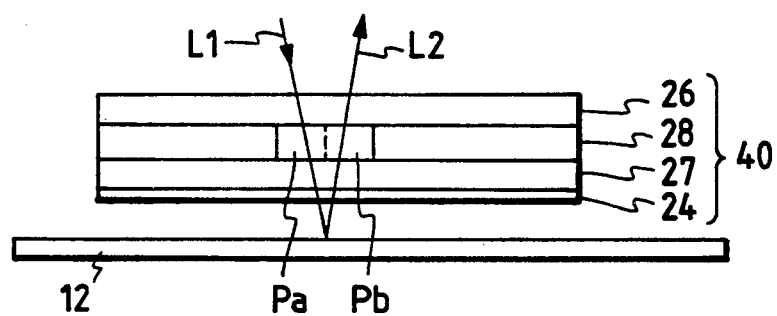
FIG. 6 is a sectional view showing a color liquid crystal display using an ECB liquid crystal cell, as a liquid crystal display according to the composition of FIG. 3.

In order to solve this problem, the ECB (electrically Controlled Birefringence) type liquid crystal cell 40 is incorporated in the liquid crystal display 18 as shown in FIG. 6. The ECB type liquid crystal cell 40 is not equipped with a color filter but the birefringence characteristics of the liquid crystal are altered by controlling an applied voltage, thereby causing the wavelength components of light emitted as interference light between a vertical polarization component and a horizontal polarization component to vary, resulting in variation in the displayed color. Therefore, incident light $L_1$ entering the liquid crystal cell 40 from a light source and transmitted therethrough maintains the same light intensity even after passing through any pixel.

Figure 7:
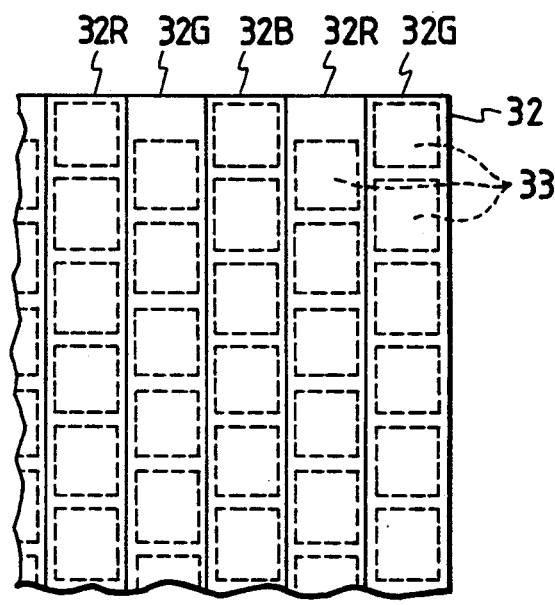
FIG. 7 is a plan view showing an example of the relationship between a stripe color filter and pixels used in an embodiment of the present invention.
Figure 8:
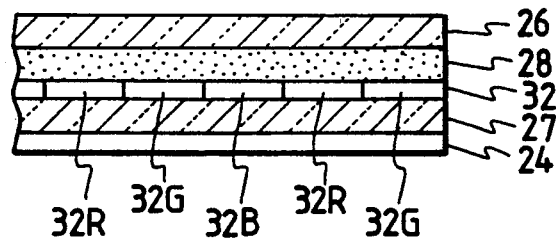
FIG. 8 is a sectional view showing a liquid crystal panel using the color filter of FIG. 7 and employed in the embodiment of the present invention.

Next, another scheme to solve the problem of variations of displayed color in a color display system is described. In this case, a color liquid crystal display using a color filter as the liquid crystal display 18 is incorporated. An example of the color filter 32 is a stripe color filter shown in FIG. 7 where a red stripe (narrow and long band-like red filter) 32R, a green stripe 32G and a blue stripe 32B are cyclically disposed. The stripe color filter is formed inside a transparent substrate 27 as shown in FIG. 8. Pixels 33 of the liquid crystal display 18 are aligned along an extension direction of each stripe color filter in opposition thereto, as shown in FIG. 7. Although each array of the pixels 33 is shifted from adjacent pixels by a half pitch of the pixel in FIG. 7, this shifting may not always be necessary.

Figure 9A:
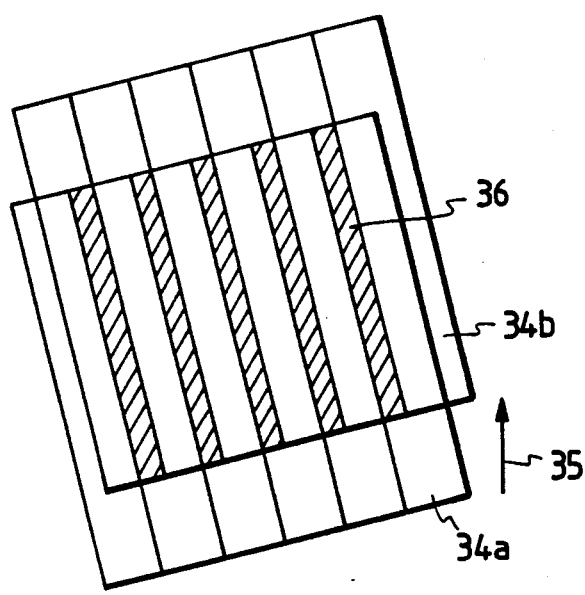
FIG. 9A is a view to show a state in which an extension direction of a stripe image of a color filter becomes out of place with the deviation direction of a filter image.

Since a structure as described above is used, when a pattern of the color filter 32 of the color liquid crystal display 18 incorporated in the arrangement of FIG. 3 is projected and the projected image thereof becomes a double vision of filter pattern images 34a and 34b as shown in FIG. 9A for example, an extension direction of the stripe of the filter image is slanted toward the shifting direction 35 of the images. As a result, filter stripe images of different colors are superposed and subtractively mixed in the hatched zones 36. Owing to the presence of the zones 36, the stripes become apparently narrower and darker. Therefore, by adjusting the projected image to a brightest state by rotating the liquid crystal display 18 on the base 11, the extension direction of stripe images of the color filter 32 can be brought into agreement with the image shifting direction 35. Accordingly, the color filter stripes of the color filter through which incident light from the light source passes upon entering the liquid crystal panel 19, become the same color filter stripes through which the light reflected by the mirror Fresnel lens 12 is transmitted when it passes the liquid crystal panel 19.

In this state, superposed portions of filter pattern images 34a and 34b become stripe images of the same color, while neither falling in double vision nor creating substrative mixing. The brightness image does not exhibit double vision as described before. Therefore, generally satisfactory color display is obtainable. Since the shifting direction 35 of the image is determined by the positional relationship between the light source 15 and the lens 16, it is also possible to provide a positioning device of the liquid crystal display 18 on the base 11 to facilitate bringing the stripe extension direction gf the color filter 32 in the liquid crystal display 18 into agreement with an image shifting direction. If a projected image is skewed after adjusting the extension direction of the stripe image into agreement with the image shifting direction, it is also possible to compose a projector so that skewing is optically correctable.

Figure 9B:
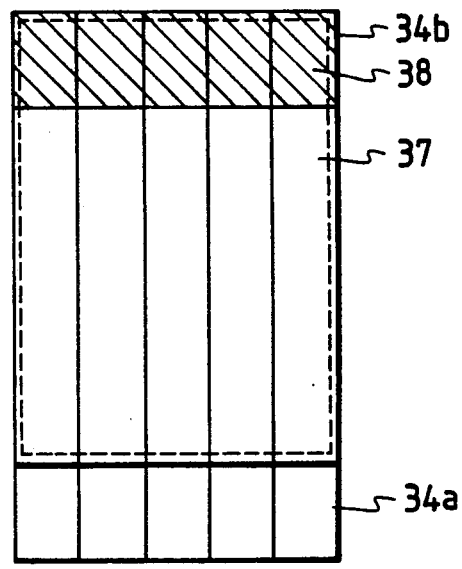
FIG. 9B is a view showing the relationship between an image in a color filter and a contrast image of a liquid crystal display.

In the state where each pixel of the liquid crystal panel 19 is in agreement with the color filter 32, the projected image of a pixel in the liquid crystal panel 19 is a brightness image caused by the reflected light $L_2$ as described before. Therefore, incident light $L_1$ does not create an image. In FIG. 9B, the brightness image 37 is indicated by the dotted line, which is shifted from the image 34a by the incident light $L_1$ of the color filter 32. The image 34 produced by the reflected light $L_2$ of the color filter 32 overlaps the image 37. Therefore, in the area of the brightness image 37, namely the display area, the filter images 34a and 34b do not overlap each other in the hatched regions 38. In a portion where the filter images 34a and 34b are in superposition, light is transmitted twice through the filter. Since the light passes through the filter only once in the region 38, a difference in color density occurs between the superposed region and the non-superposed region 38.

Figure 9C:
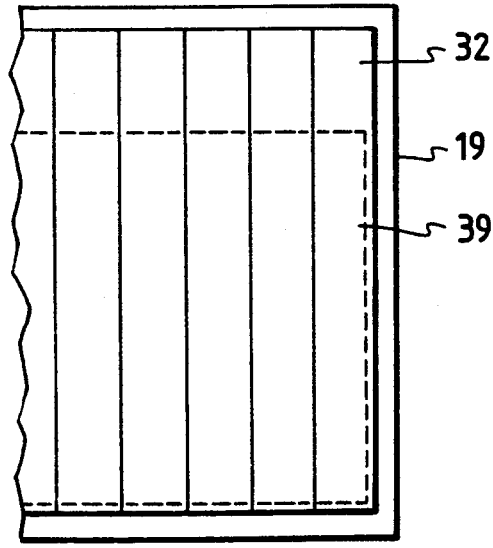
FIG. 9C is a plan view showing an example relationship between a display area of the liquid crystal panel and the color filter.

In order to solve this problem, it is satisfactory to form the color filter 32 by extending in an extension direction of the stripe and the image shifting direction beyond the display area 39 (dotted line) of the liquid crystal panel 19 as shown in FIG. 9C.

In the polarization plate separation system shown in FIG. 3, it was successful to enlarge and display a color image by using, as the liquid crystal display 18, phase film compensation STN type liquid crystal display and making the stripe width of the color filter 32 0.11 mm. In the case of FIG. 9C, it was possible to assure color densities of projected brightness images uniform over the entire display area by extending the color filter 32 by 1 mm beyond the liquid crystal panel 19 and making the gap between the liquid crystal display 18 and the mirror Fresnel lens 12.3 mm.

The color filter 32 should preferably comprise a color interference filter. A color interference filter provides a preferred display of colors by using multiple layers of, for example, $SiO_2$ and $TiO_2$ and changing the thickness of each layer. The color filter used in an ordinary color liquid crystal display produces colors by absorbing light with dyes or pigments. Therefore, every time light passes through the ordinary color filter, a component of the light is absorbed. With a reflection type liquid crystal overhead projector, a projected image of display becomes dark because the light passes twice through the ordinary color filter. By using a color interference filter, however, the peak transmission rate in the transmission spectrum is substantially 100% while suppressing loss of the light to a minimum and producing a bright and clear color display.

According to the polarization plate separation system as described before, the image on a conventional image film sheet can be projected as an enlarged display by removing the liquid crystal display 18. At that time, the separated polarization plate 25 should also preferably be removed. When the liquid crystal display 18 is used again after the projector has been operated to provide an enlarged display of an image on the image film sheet, it is necessary to adjust the relative angle between the polarization plate 24 of the liquid crystal display 18 and the separated polarization plate 25, into a predetermined state.

Figure 11A:
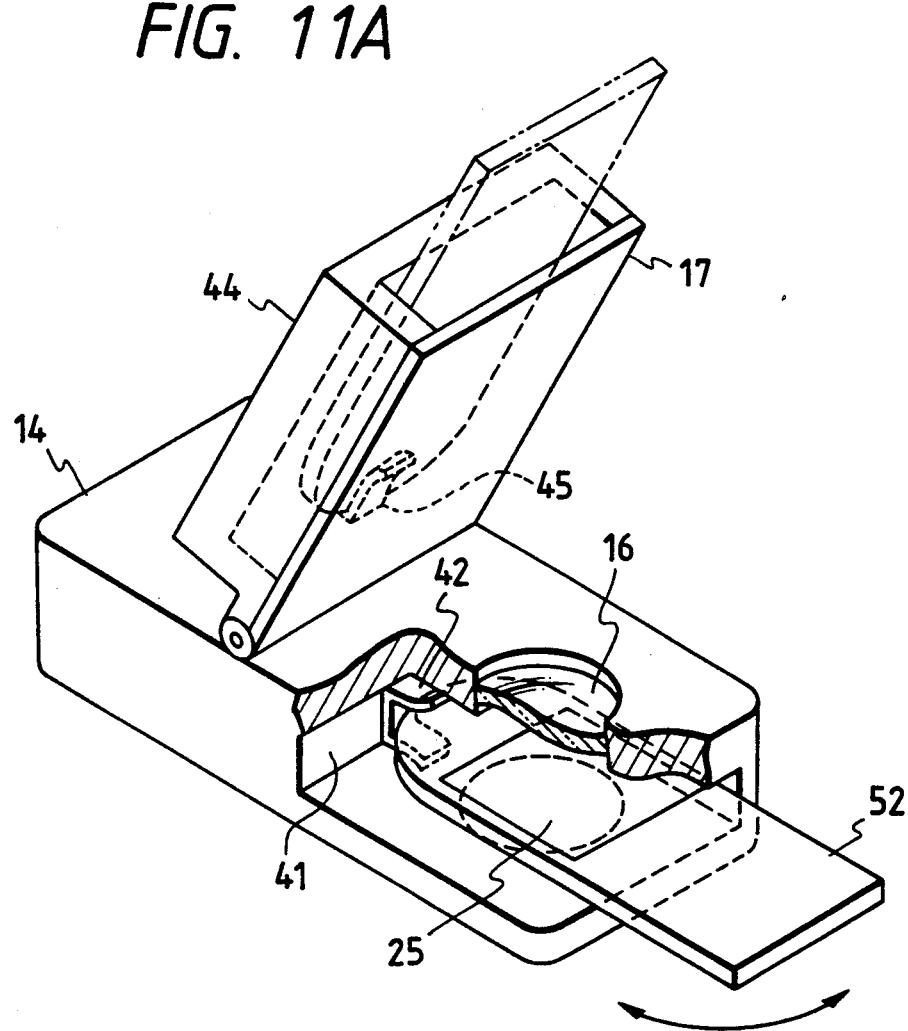
FIG. 11A is an enlarged and partial cutaway oblique view of a portion of a separated polarization plate holding means.
Figure 11B:
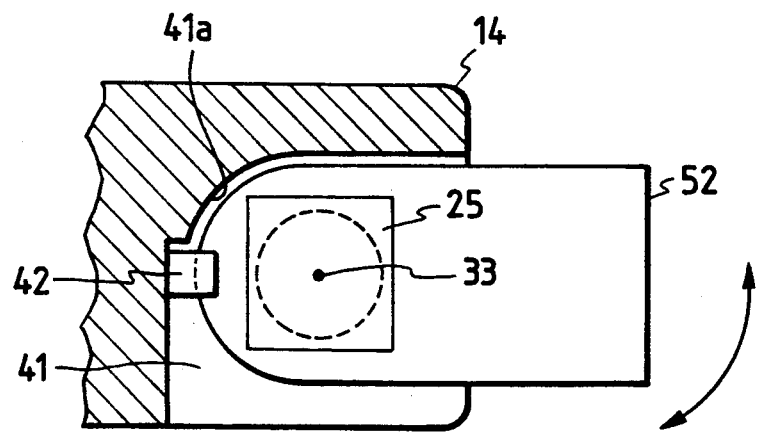
FIG. 11B is a horizontal section view of a polarization plate mounting hole 41.

To achieve this, it is satisfactory to hold the separated polarization plate 25 an arrangement of the type shown in FIGS. 10, 11A and 11B for example. That is, in this example, a slit-like polarization plate mounting hole 41 is formed in adjacent side surfaces of the holding portion 14 below the projection lens 16. The separated polarization plate 25, held by a frame body 52, is inserted into the polarization plate mounting hole 41. In this state, the separated polarization plate 25 is in opposition to the projection lens 16.

Deep in the polarization plate mounting hole 41, there is a U-shaped holder 42, formed by bending a leaf spring, which resiliently pinches and holds an end portion of the inserted frame body 52. In addition, it is possible to rotate the separated polarization plate 25 substantially around a center of the optical axis 43 of the projection lens 16. In order to facilitate such rotation, in the example shown in FIG. 11B, the insertion end portion of the frame body 52 is shaped semi-circular substantially around a center of the optical axis 33. In proximity thereto, a peripheral wall of the polarization plate mounting hole 41 is made as a semi-circular guide wall 41a coaxial therewith.

In this example, a housing portion 44 is provided to house the separated polarization plate 25 when it is removed. The housing portion 44 is constructed in such a manner that the separated polarization plate 25 can be accommodated along the mirror 17 from the upper side thereof into the rear side of the mirror 17. A holder 45 similar to the holder 42 is also provided in a deep part of the housing portion 44.

Since a construction as described above is employed, when a film image, etc. is enlarged and displayed instead of using the liquid crystal display 18, it is satisfactory to remove the liquid crystal display 18 and the separated polarization plate 25 while directly disposing the image film, etc. onto the mirror Fresnel lens 12. The separated polarization plate 25 will not be lost because the separated polarization plate 25 can be accommodated in the housing portion 44.

When an image on the liquid crystal display 18 is to be enlarged and displayed after that, the liquid crystal display 18 is disposed on the mirror Fresnel lens 12 while the separated polarization plate 25 is held in place by inserting it into the polarizaton plate mounting hole 41. In this state, the display image on the liquid crystal display 18 is displayed on the screen 20 in an enlarged manner, and the separated polarization plate 25 is rotated and adjusted so that the displayed image becomes clear and bright. That is, the angle between polarization directions of the polarization plate 24 of the liquid crystal display 18 and the separated polarization plate 25 is controlled.

However, it is also possible to eliminate adjustment of the angle of the separated polarization plate 25, by mechanically connecting the liquid crystal display 18 and the separated polarization plate 25 as separate from the liquid crystal panel and only mounting the liquid crystal display 18 on the base 11, the separated polarization plate 25 being positioned in place at a predetermined angle.

Figure 12:
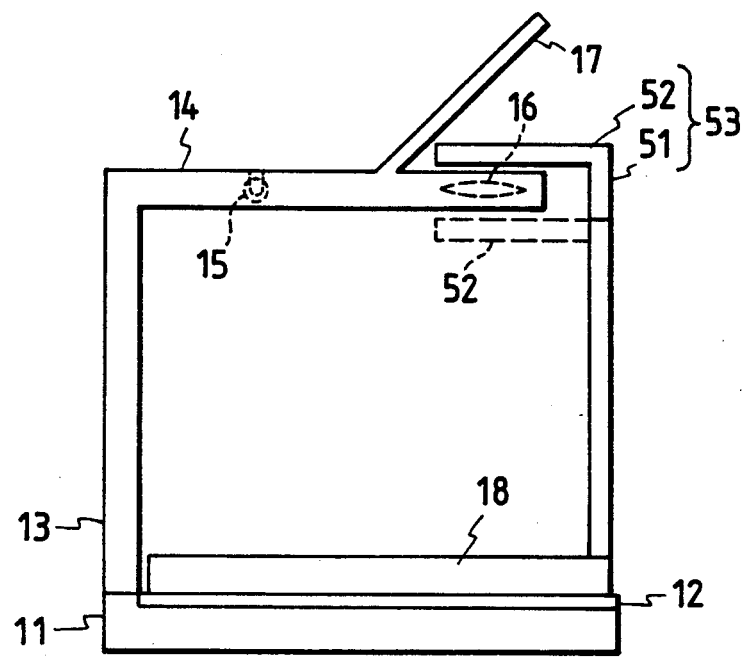
FIG. 12 is a side view showing still another embodiment of the present invention.
Figure 13:
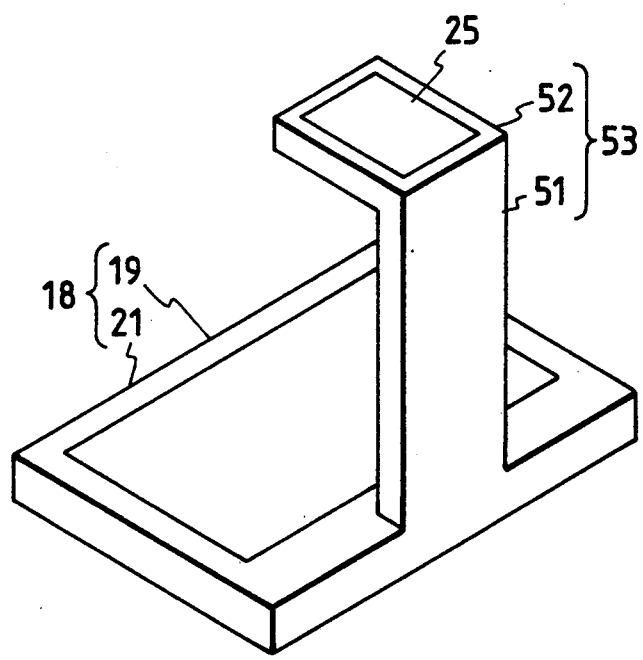
FIG. 13 is a perspective view to show a coupling state between the liquid crystal display and the separated polarization plate.

Such an example is shown in FIGS. 12 and 13. In this embodiment, a supporting pole 51 is erected on the frame body 21 of the liquid crystal display 18 on the side opposite to the supporting pole 13 and in opposing relation thereto. On the supporting pole 51, the frame-like body 52 in opposition to the liquid crystal panel 19 is fixed immediately above the projection lens 16, and the separated polarization plate 25 is inserted into and held by the frame-like body 52. In this state, the positional relationship between the separated polarization plate 25 and the liquid crystal panel 19 is made the best, that it, the best visible state of an enlarged and projected image. The supporting pole 51 and the frame-like body 52 compose a connecting means 53.

With such a construction, when the liquid crystal display 18 is removed from the base 11 and then disposed again on the mirror Fresnel lens 12, the positional relationship between the liquid crystal panel 19 and the separated polarization plate 25 automatically becomes the best, avoiding the need to adjust the angle of the separated polarization plate 25. As shown by the dotted line of FIG. 12, the connecting means 53 may also be so constructed that the separated polarization plate 25 is positioned immediately beneath the lens 16.

Figure 14:
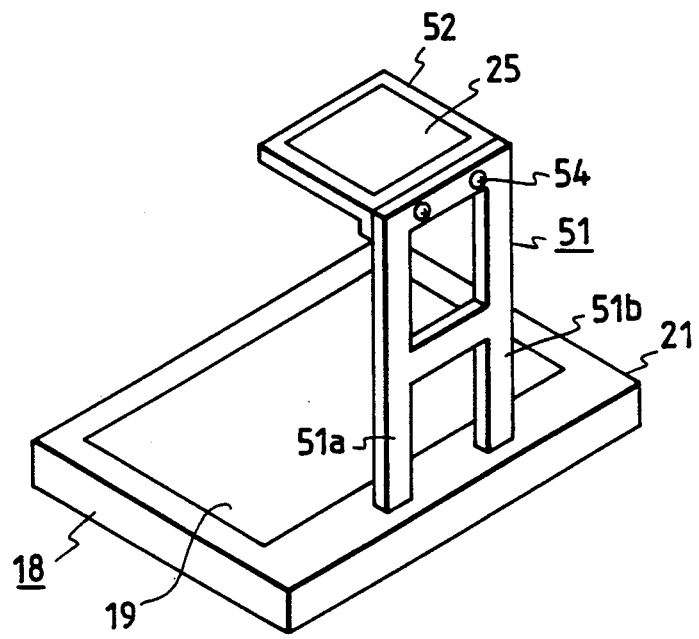
FIG. 14 is a perspective view showing an assembled state for an assembled type embodiment of the connection means 53 in FIG. 13.
Figure 15:
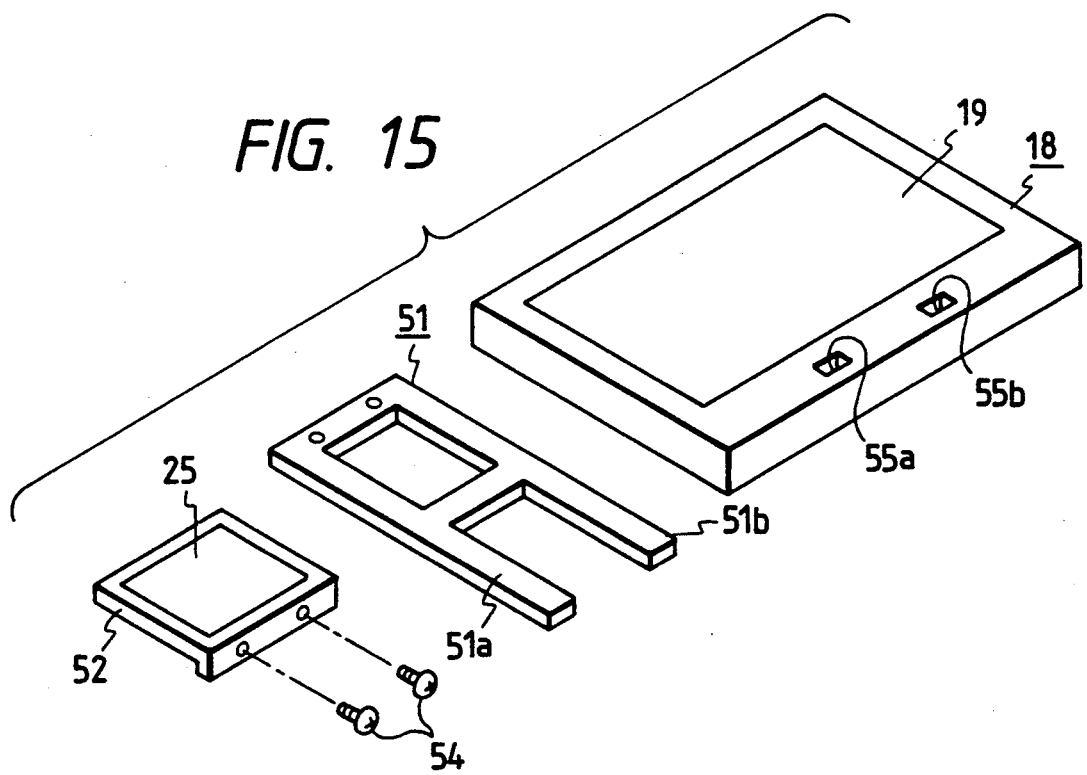
FIG. 15 is a perspective view to show a disassembled state of FIG. 14.

It is also possible to compose the connecting means 53 in an assembly type. An example is shown in FIGS. 14 and 15 in which the supporting pole 51 and the frame-like body 52 are constructed separately, the frame-like body 52 being mounted detachably onto the supporting pole 51 using screws 54. At least the lower end portion of the supporting pole 51 is comprised of two leg portions 51a and 51b which are detachably engaged with and inserted in mounting holes 55a and 55b formed in the upper surface of the frame body 21, thus mounting the supporting pole 51 on the frame body 21.

Figure 16A:
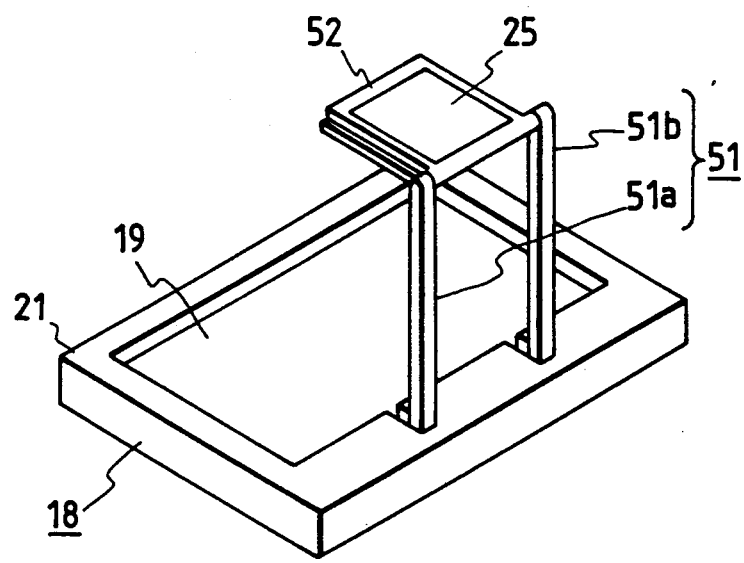
FIG. 16A is a perspective view showing an assembled state of another embodiment of the assembled type connecting means 53.

Or, as shown in FIG. 16, the supporting pole 51 may comprise only two leg portions 51a and 51b which erect the supporting pole 51 foldably on the frame body 21 of the liquid crystal display 18 and the frame-like body 52 is foldably mounted between the upper ends of the leg portions 51 and 51b. When the liquid crystal indicator 18 is not used, the leg portions 51a and 51b are folded down on the liquid crystal panel 19, and the frame-like body 52 is folded and disposed between the leg portions 51a and 51b and made in contact with the liquid crystal panel 19.

Figure 17A:
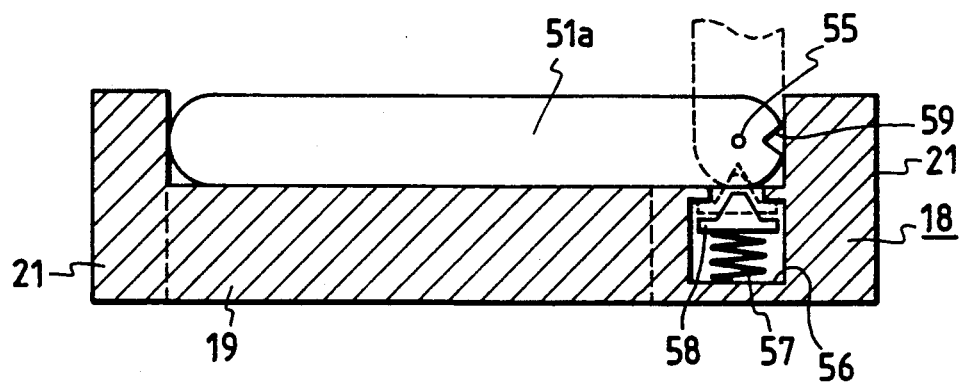
FIG. 17A is a sectional view showing a mechanism by which the leg portion in FIG. 16A is made foldable to erect and set down.

An example of such a foldable holding of the supporting pole 51 is shown in FIG. 17A in which the lower portion of the supporting pole 51 is mounted on a shaft 55 freely pivotable in relation to the frame body 21 while forming a recess 56 in the frame body 21 underneath the shaft 55. In the recess 56, an elevation 58 is disposed in a state biased toward the upper side by means of a spring 57. When the leg portion 51a is erected as shown by the dotted line, the elevation 58 is initially retracted against the force of the spring 57 and the engages the elevation 58 into a groove 59 formed in the lower end of the leg portion 51a by the force of the spring 57, whereby the leg portion 51a is held in an erect state. However, the leg portion 51a can be folded down by forcefully rotating the leg portion 51a.

Figure 16B:
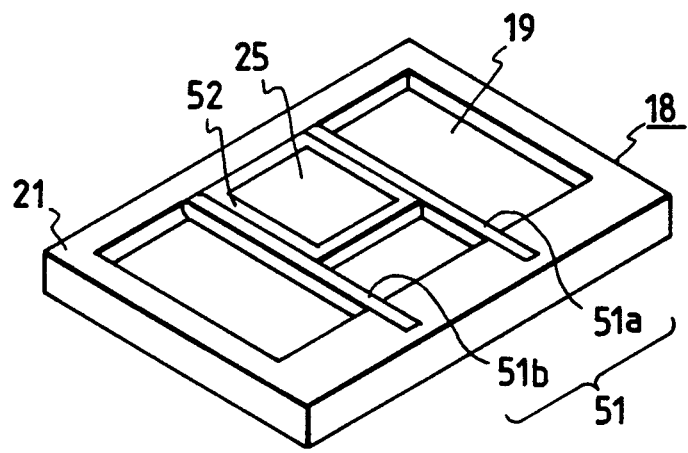
FIG. 16B is a perspective view to show a folded state of FIG. 16A.
Figure 17B:
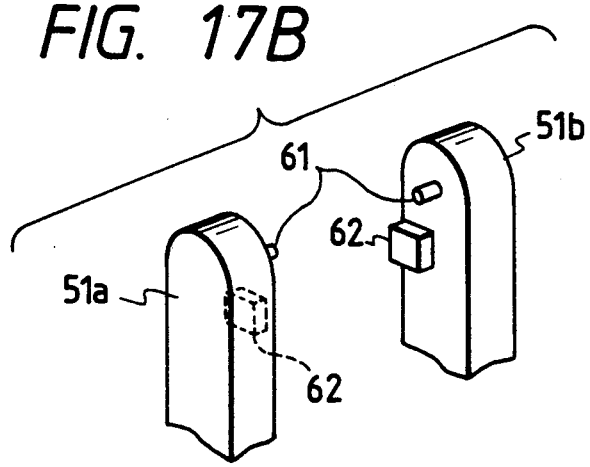
FIG. 17B is a perspective view to show upper portions of the two leg portions in FIG. 16A.
Figure 17C:
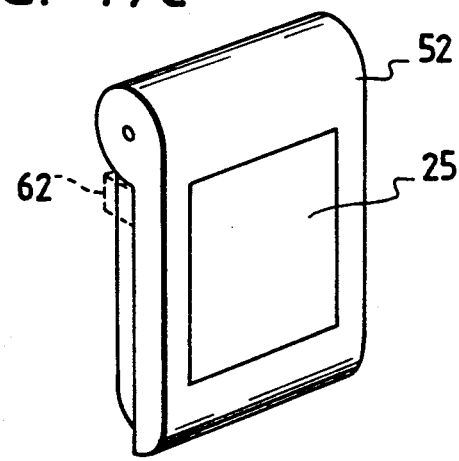
FIG. 17C is a perspective view to indicate the frame body in FIG. 16A.

As shown in FIGS. 17B and 17C, when the leg portions 51a and 51b are erected while rotating the frame-like body 52 through 270° from the state where the frame-like body 52 is held freely rotatable between the leg portions 51a and 51b about the shaft 61 while the frame surface of the frame-like body 52 is in the same plane as those of the leg portions 51a and 51b, that is, the state that the supporting pole 51 is accommodated in the liquid crystal display 18 as shown in FIG. 16B, one surface of the frame-like body 52 protrudes inside the leg portions 51 and 51b while abutting a fixed stopper 62; thereby the frame-like body 52 is maintained horizontal.

Figure 18:
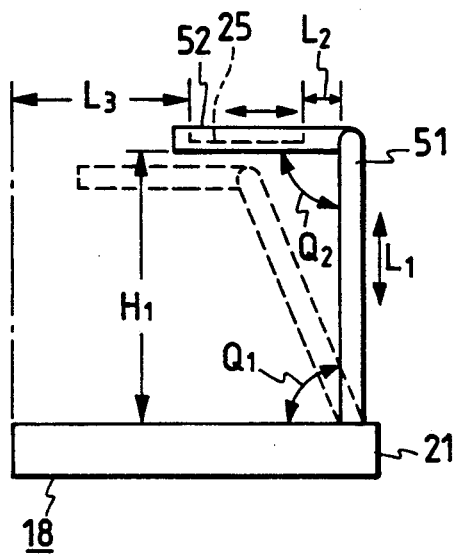
FIG. 18 is a side view to denote the connecting means provided with an adjusting means.

There are a plurality of sizes practically for the reflection type overhead projectors. For instance, various heights of the supporting poles 13 are used. Therefore, when an attempt is made to mount the liquid crystal display 18 and the separated polarization plate 25 as shown in FIG. 12, it sometimes occurs that the frame-like body 52 abuts the mirror 17, preventing the mounting. Furthermore, different horizontal lengths of the holding portions 14 are also practically used, in which the positions of the projection lenses 16 become different in a horizontal direction and, when the liquid crystal display 18 is mounted, it sometimes occurs that the separated polarization plate 25 is not in correct opposition to the projection lens 16. Accordingly, it is preferable as shown in FIG. 18 that the length $L_1$ of the supporting pole 51 is made adjustable, the protrusion length $L_2$ of the separated polarization plate 25 out of the supporting pole 51 is also made adjustable and more preferably, the horizontal angle $\theta_1$ of the supporting pole 51 and the angle $\theta_2$ between the frame-like body 52 and the supporting pole 51 are also made adjustable. By adjusting $L_1$ and $L_2$ and/or $\theta_1$ and $\theta_2$, it is possible to adjust the height $H_1$ of the separated polarization plate 25 from the liquid crystal panel 19 and the horizontal distance $L_3$ of the liquid crystal panel 19 from a reference position.

Figure 19A:
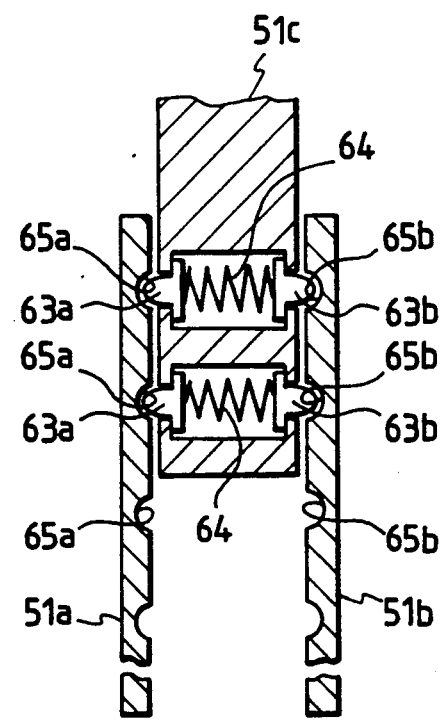
FIG. 19A is a sectional view to indicate an example of the mechanism to adjust the length of the supporting pole.

An example of the construction for adjusting $L_1$ is shown in FIG. 19A where the supporting pole 51 comprises a movable portion 51c held between the leg portions 51a and 51b in a freely movable manner, and plungers 63a and 63b are provided on both sides of the movable portion 51c and forced outwardly by springs 64. In addition, a plurality of recesses 65a and 65b are arrayed and formed in a longitudinal direction so as to be able to engage with the plungers 63a and 63b. Thus, $L_1$ is adjusted by selecting which of the recesses 65a and 65b, is to be engaged by the plungers 63a and 63b.

Figure 19B:
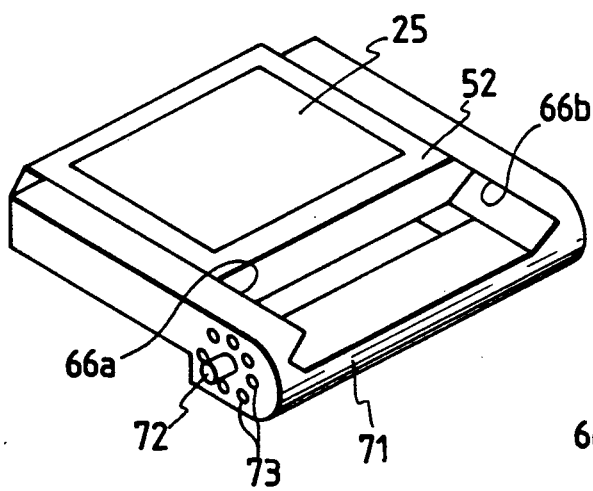
FIG. 19B is a perspective view to show an example of the mechanism to move the frame body.

An example of a construction for adjusting $L_2$ is shown in FIG. 19B in which guide rails 66a and 66b in opposition protrude from the supporting pole 51, and the frame-like body 52 is held between the guide rails 66a and 66b so that the body can freely slide along the guide rails 66a and 66b with both sides thereof in engagement with the rails. $L_2$ is adjusted by moving the frame-like body 52 along the guide rail 66a and 66b.

Figure 19C:
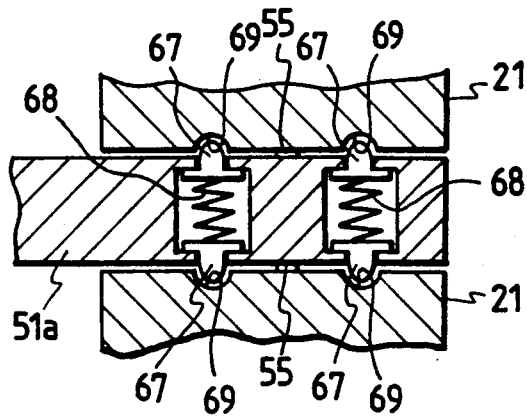
FIG. 19C is a sectional view to denote an example of the mechanism to adjust the angle of the supporting pole 51.

An example of a construction for adjusting $\downarrow_1$ is shown in FIG. 19C where a part of the leg portion 51a inserted in the groove of the frame body 21 is made freely rotatable around a center of the shaft 55 while plungers 67 are forcedly protruded outwardly by springs 68 in both sides of the leg portion 51a, namely in both end sides of the shaft 55. The plungers engage some of the recesses 69 formed on a circle with a center of the shaft 55, on both wall surfaces of the groove in the frame body 21. $\theta_1$ is adjusted by selecting which of the recesses 69 is to be engaged.

The adjustment of $\theta_2$ can be performed by a mechanism substantially similar to that of adjusting $\theta_1$. Briefly, referring to FIG. 19B, the shaft 72 protrudes from both end surfaces of the connecting portion 71 in the same end side of the guide rails 66a and 66b. The connecting portion 71 is mounted rotatably onto the supporting pole 51, and plungers protrude outwardly from the supporting pole 51, due to biasing forces of springs, though not illustrated in FIG. 19B. $\theta_2$ is adjusted by selecting which of a plurality of recesses 73 on a circle around the shaft 72 are engaged by the plungers.

Figure 2:
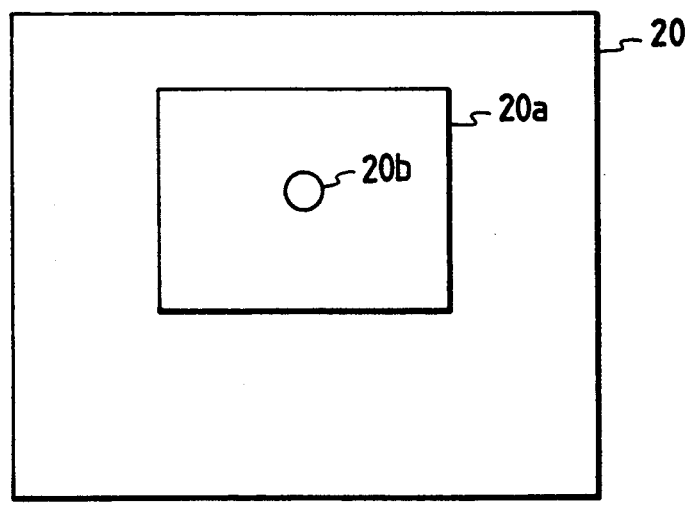
FIG. 2 is a view showing a spot of a light source image on the screen of a conventional reflection type liquid crystal overhead projector.
Figure 20:
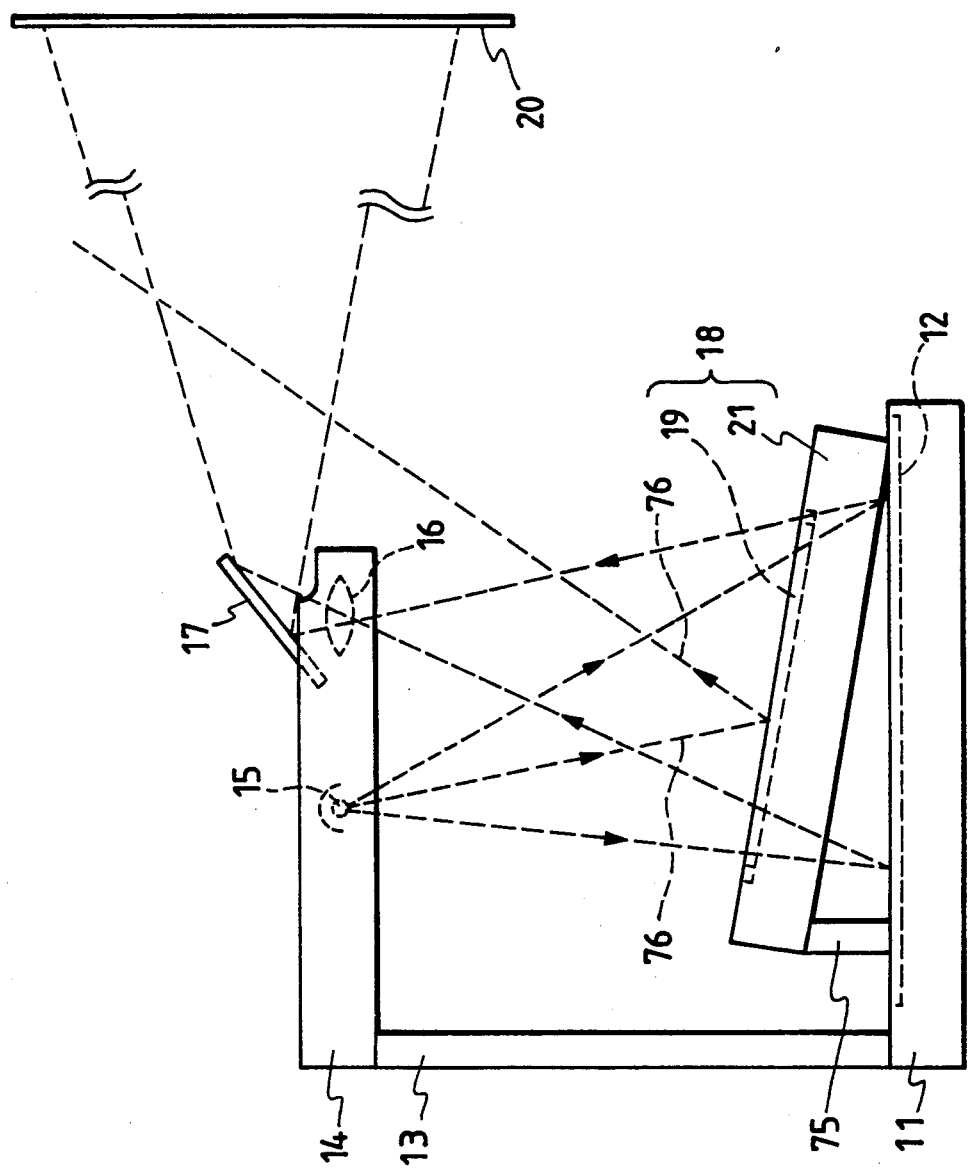
FIG. 20 is a side view to indicate still another embodiment of the present invention.

Next, it is described how to solve the problem of a bright spot 20b on the screen 20 described referring to FIG. 2. An embodiment thereof is shown in FIG. 20. Portions in FIG. 20 corresponding to those in FIG. 1 are designated with the same numerals. In the FIG. 20 embodiment, an elevation 75 is mounted on a marginal side portion of the bottom surface of the liquid crystal display 18. Therefore, the liquid crystal panel 19 is disposed in inclination toward the mirror Fresnel lens 12. A light source image emitted from the light source 15 and reflected on the surface of the liquid crystal panel 19, such as a filament, is reflected in a direction of the projection lens 16 as shown by the line 76 and does not arrive inside a projection area of the liquid crystal panel on the screen 20. That is, no bright spot appears on the projection plane of the liquid crystal panel while maintaining the projection plane in a uniform illuminance so as to display a display image on the liquid crystal panel easy visibly at any part in an enlarged manner.

Figure 21:
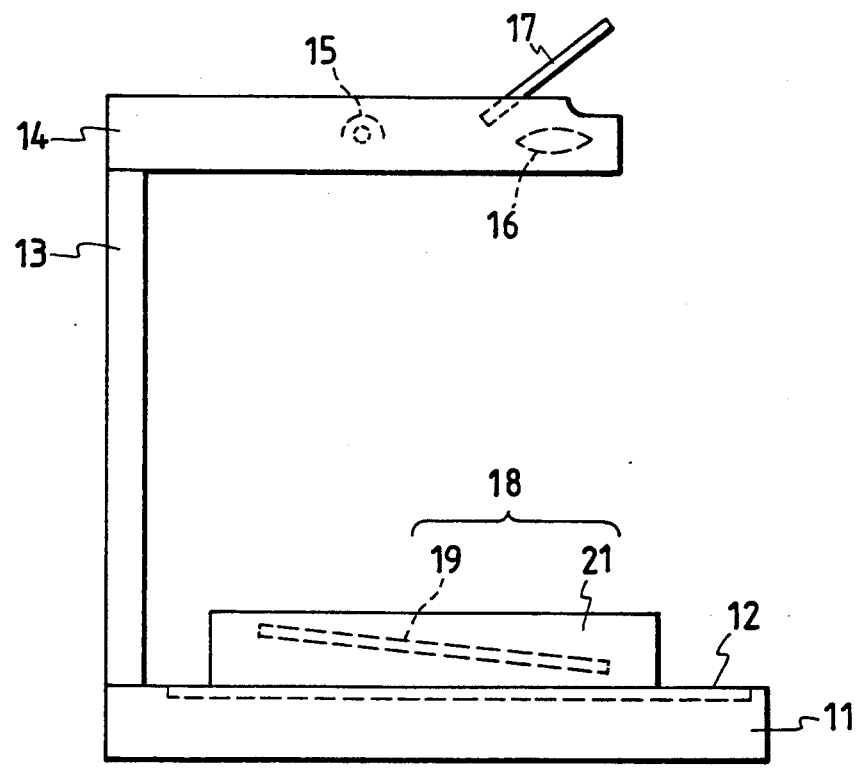
FIG. 21 is a side view showing still another embodiment of the present invention.

As shown in FIG. 21, it is also possible to mount the liquid crystal panel 19 at a slant to the frame surface of the frame body 21 in the liquid crystal display 18 while omitting the elevation 75 in FIG. 20 and disposing the liquid crystal display 18 on the mirror Fresnel lens 12. Also in this case, the liquid crystal panel 19 is mounted slanted to the mirror Fresnel lens 12 bringing the same effect as in the case of FIG. 20.

Removing a bright spot 20b from the screen by mounting the liquid crystal panel 19 at a slant to the mirror Fresnel lens 12 is applicable also to the polarization plate separation system shown in FIG. 3.

Figure 22:
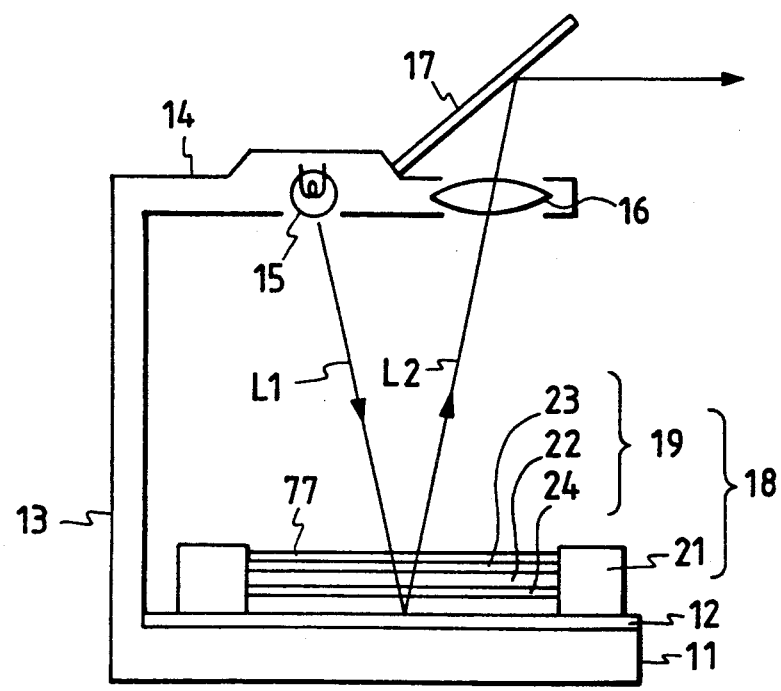
FIG. 22 is a side view to indicate still another embodiment of the present invention.

It is also possible to remove a bright spot 20b from the screen 20, as follows. An antireflection layer 77 is formed on the surface of the liquid crystal panel 19 as shown in FIG. 22, wherein parts corresponding to those in FIG. 1 are designated by the same numerals. An example of the antireflection layer 77 comprises a single layer film of MgF$_2$ directly coated on the surface of the liquid crystal panel 19 by the vapor deposition. To achieve a greater antireflection effect, it is also possible to form the layer as a multi-layer film comprising SiO$_2$ and TiO$_2$.

Figure 23:
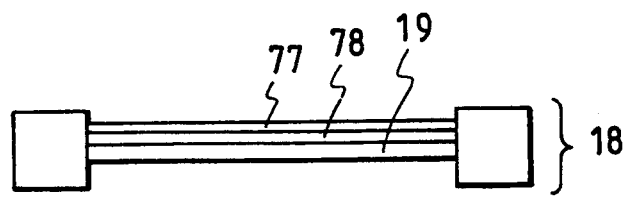
FIG. 23 is a sectional view to denote an example of an antireflection layer formed on a transparent substrate.

Another example of the antireflection layer is shown in FIG. 23 where the antireflection layer 77 is coated on a transparent substrate 78 comprising a glass plate or a polymer resin film which is attached to the liquid crystal panel 19 by an ultraviolet-ray curable adhesive or a tacky agent. In such a case, it is preferable to match the refractive indexes of the transparent substrate 78 and the adhesive, etc. with that of the liquid crystal panel 19, to prevent a boundary reflection phenomenon. The film with the antireflection layer in use may comprise a commercially available product such as HEA2000 supplied by OCLI.

According to the present invention as described above, the antireflection layer 77 is formed on the surface of the liquid crystal panel 19. Therefore, even if an image of the light source 15 is reflected from the liquid crystal panel 19, the quantity of light reflected onto the projection lens 16 is significantly reduced along with greatly decreasing the illuminance of light source image spot 20b on the screen 20, thereby substantially preventing the appearance of the spot 20b illuminating each part of the screen uniformly.

Figure 24:
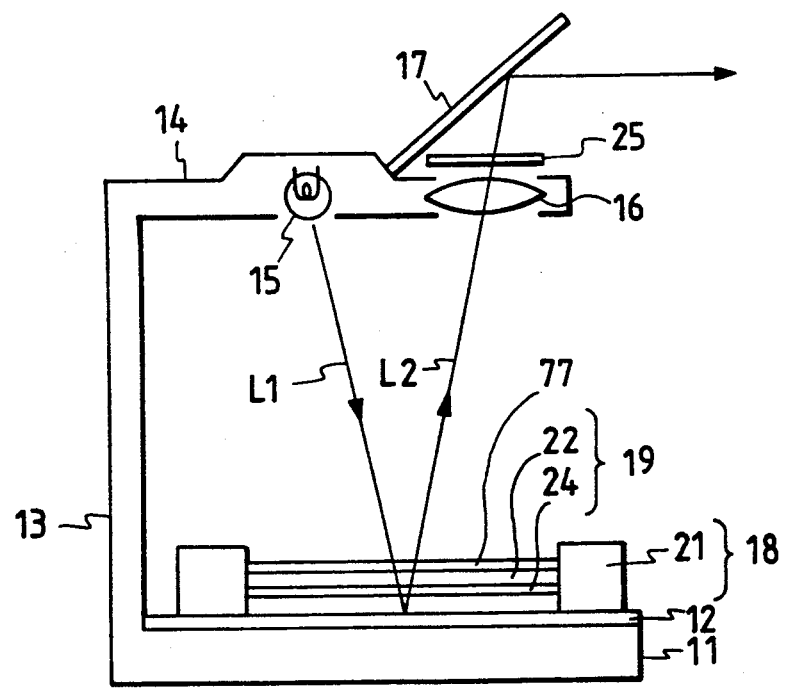
FIG. 24 is a side view showing still another embodiment of the present invention.

Also with the polarization plate separation system shown in FIG. 3, an antireflection layer 77 is formed on the surface of the liquid crystal panel 19 as shown in FIG. 24. It was revealed in this case that there was something to be noted when the equipment with the antireflection layer 77 coated on a plastic film 78 was used. More explicitly, if the plastic film 78 was used, a displayed color became different from the original displayed color without it. For example an original white or black display was changed to a green or red display. As its cause was investigated, it was revealed that the anisotropy of the plastic film 78 caused this phenomenon. That is, referring to FIG. 24, light reflected from the mirror Fresnel lens 12 passes sequentially through the polarization plate 24, liquid crystal cell 22, antireflection coated film 58 and the separated polarization plate 25 and is then projected onto the screen. If there is an anisotropy in the refractive index of the plastic film 78, a phase difference (retardation) is created corresponding to $\Delta n \cdot d$ ($\Delta n$: difference between refractive indexes of ordinary light and extraordinary light, d: thickness of the film) before and after the transmission through the plastic film 78, thereby varying polarization state. Consequently, a displayed color becomes different from that without the film 78.

Figure 25:
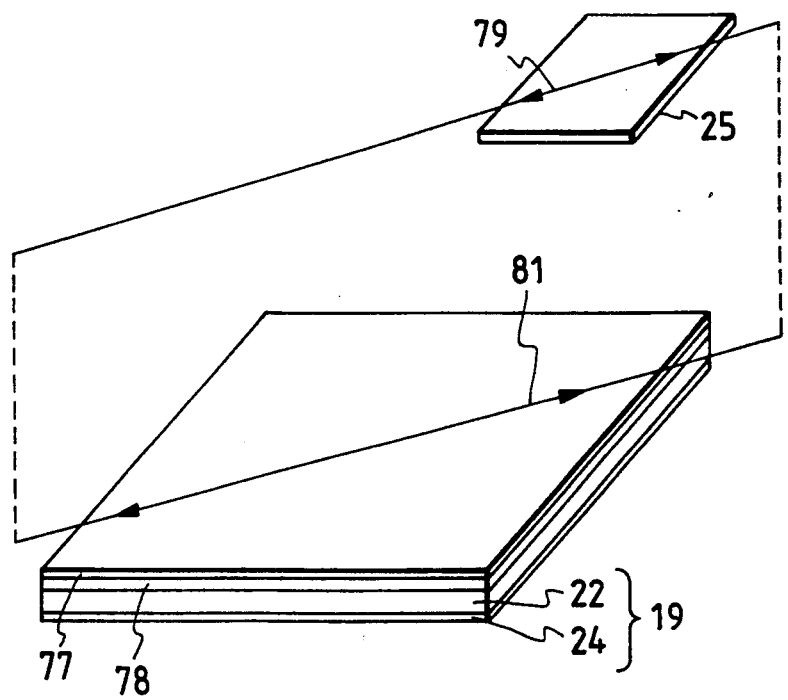
FIG. 25 is a perspective view indicating the relationship between the film 78 and the separated polarization plate 25 in FIG. 24.

In order to avoid such a change of a displayed color, it is satisfactory to use a film having small or completely no retardation, namely small anisotropy of the refractive index. However, even with a film 78 of which the $\Delta n d$ is not so small, it is possible to avoid variation of a displayed color by using the following methods. More explicitly, as shown in FIG. 25, it is satisfactory to dispose the film 78 so that the optical axis 81 of the film 78 becomes parallel to the transmission axis 79 of the separated polarization plate 25 or they are perpendicular to each other. The anisotropy of the film 78 is created often during an extension process of manufacture in which an extension direction becomes the optical axis direction 81. Refractive index for light with its direction of electric field vibration parallel to this optical axis direction 81 and that for light with its direction of electric field vibration perpendicular to the former are different. Consequently, the light is separated into ordinary light and extraordinary light depending on the difference of phase velocities. As a result, a phase difference (retardation) is created between the two vibration directions before and after the transmission through the film 78, thereby polarization state varies. However, provided that the transmission axis of the separated polarization plate 25 in the emission side is parallel or vertical to the optical axis of the film 78, only ordinary or extraordinary light is allowed to pass. Therefore, the phase difference does not affect the transmission rate while creating no change of displayed colors with or without the film 78.

In this case, the angular relationship between the liquid crystal cell 22 and the separated polarization plate 25 in the emission side becomes the same as that in the case of a normal liquid crystal display, that is, it is set to the optimum contrast conditions. Regarding whether displayed colors may change or may not depending on an angular relationship between the optical axis direction 81 of the film 78 and the transmission axis direction 79 of the separated polarization plate 25, more detailed description will be given later.

Figure 26A:
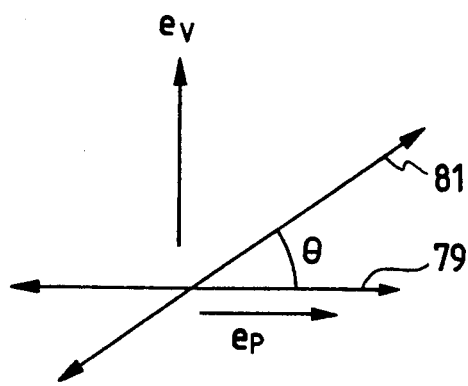
FIG. 26A is a view indicating the relationships between the optical axis of the film and the transmission axis of the separated polarization plate in FIG. 25.

The intensity I of monochrome light of a wavelength $\lambda$ passing through the separated polarization plate 25 is expressed by the following formula where, as shown in FIG. 26A, $\theta$ is an angle between the transmission axis direction 79 of the separated polarization plate 25 and the optical axis direction 81 of the film 78, $e_P$ is a magnitude of the electric field of light emitted from the liquid crystal cell 22 in the transmission axis direction 79 of the separated polarization plate 25 and ev is a magnitude thereof in the direction orthogonal to the direction 79.

Figure 26B:
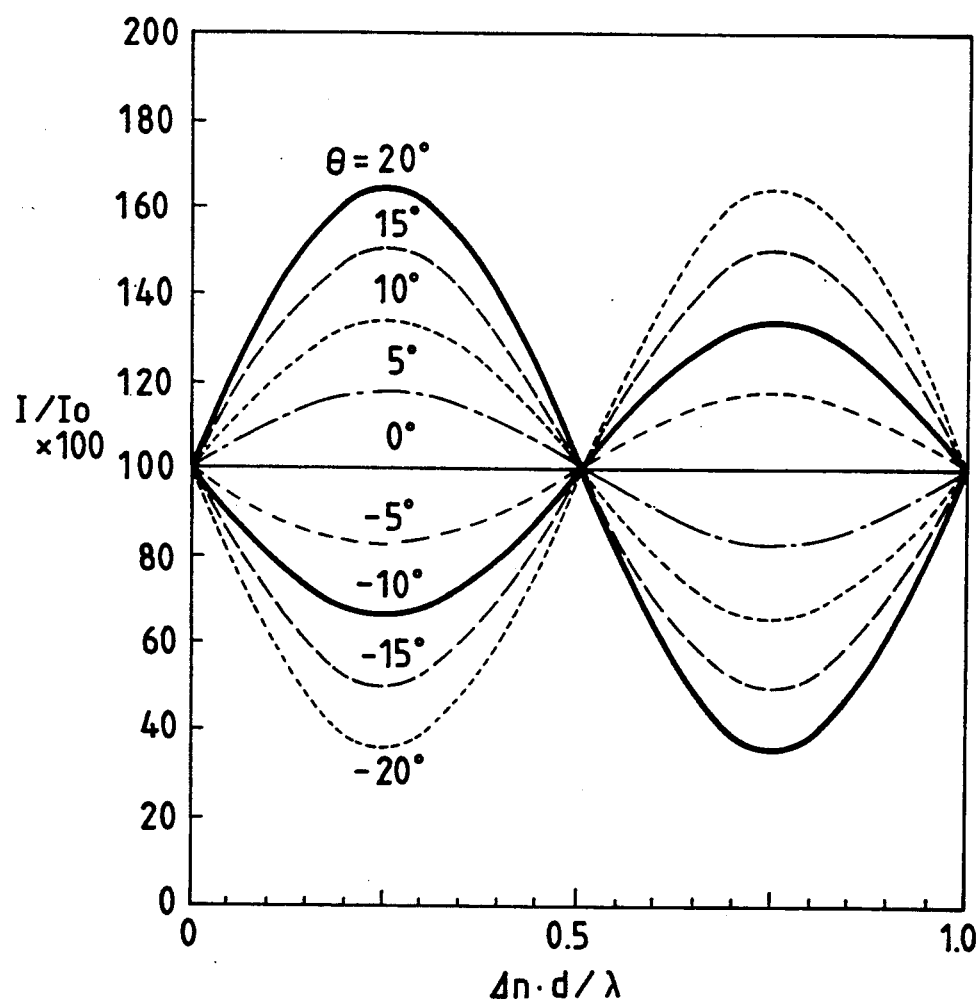
FIG. 26B is a view to indicate the change of an affect of the retardation of the separated polarization plate owing to the angle $\theta$, given to the intensity of projected light.

$I = A |e_p(e^{ib}\cos^2\theta + \sin^2\theta) + e_v(e^{ib}-1)\sin\theta\cos\theta|^2$ $b = 2\pi\Delta n.d/\lambda$, where A is a proportional constant. Without the film 78, light intensity $I_O$ is expressed by $I_O = A|e_P|^2$. The ratio $I/I_O$ becomes $I/I_O = |(e^{ib}\cos^2\theta + \sin^2\theta) + (e_v/e_P)\ e^{ib}-1)\sin\theta 0\cos\theta|^2$. When $\theta = 0$ or 90° in the formula above, $I/I_O = 1$ which reveals that the light intensity remains the same regardless of whether there is the film 78 or not and regardless of the wavelength $\lambda$. In other words, there is no change in displayed colors. FIG. 26B shows the result of a calculation for the change of $I/I_O$ assuming $e_v/e_P = i$, namely in the case of an example that incident light is circularly polarized. Provided the deviation of $\theta$ from 0° or 90° is less than several degrees, a variation amplitude of $I/I_O$ is not large and the change in displayed color also small as revealed from FIG. 26B. Consequently, it is preferable that the deviation of $\theta$ from 0° or 90° remains within ±10°.

Figure 27:
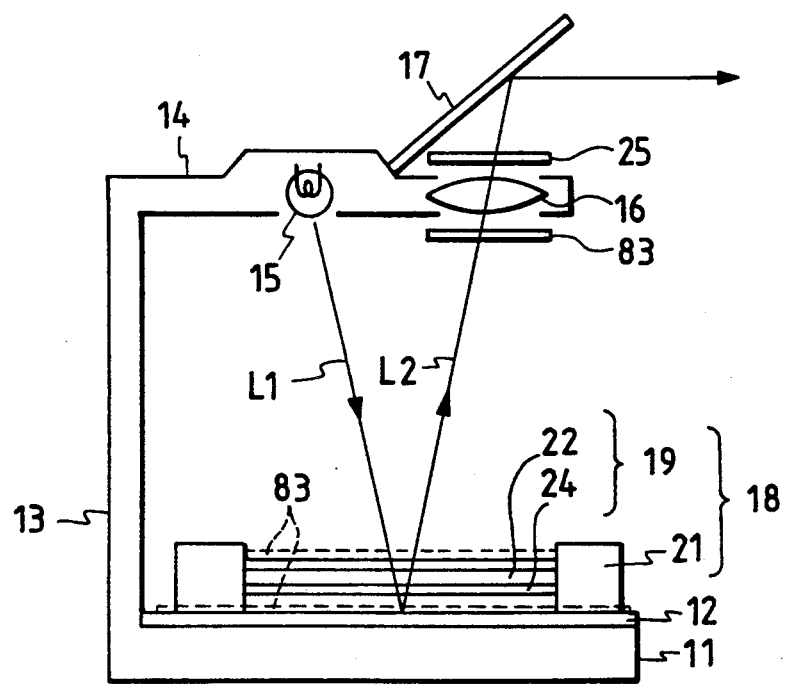
FIG. 27 is a side view showing still another embodiment of the present invention.

A halogen lamp is often used as the light source 15 because of long life and large light quantity, etc. Light emitted from a halogen lamp includes infrared rays. Therefore, if the separated polarization plate 25 is equipped near the projection lens 16, converged light passes through the separated polarization plate 25 resulting in a relatively higher density of infrared rays transmitted through the separated polarization plate 25 and increasing the temperature of the separated polarization plate 25. As a result, the separated polarization plate 25 may deteriorate. To avoid this as shown in FIG. 27, an infrared ray cutoff filter 83 is provided in the liquid crystal display side near the separated polarization plate 25 as shown in FIG. 27, that is, in this example, immediately beneath the projection lens 16, in order to eliminate infrared rays. Said infrared ray cutoff filter 83 may also be provided at any part in an optical passage from the light source 15 to the separated polarization plate 25. For example, the infrared ray cutoff filter 83 may be installed immediately above the mirror Fresnel lens 12 in superposition therewith or overlapping the liquid crystal panel 19. In such a case, the absolute quantity of interrupted infrared rays becomes larger since infrared rays are eliminated by the filter 83 in the state where the density of infrared ray energy is rather small.

According to the present invention as described above, the liquid crystal panel is not in close contact with the mirror Fresnel lens and therefore no duplicated image is created in a projected display. In addition, by removing the liquid crystal display, the equipment may also be used as a reflection type overhead projector using a conventional image film sheet.

Furthermore, by using a color ECB type liquid crystal display, mixing of colors does not occur while assuring high-quality color display.

Also by using a stripe color filter as the liquid crystal display while disposing pixels along the stripe, qualities of displayed colors are made more excellent because it is possible to make light incident to the liquid crystal panel, reflected from the mirror Fresnel lens and transmitted again through the liquid crystal panel to pass through the stripe in the same color as it entered therein.

Moreover, by holding the separated polarization plate freely rotatable, the adjustment to dispose the liquid crystal display on the base is made easier.

Furthermore, by connecting the liquid crystal display to the separated polarization plate while maintaining a specified relative position therebetween and rearranging the liquid crystal panel again on the base, the separated polarization plate can automatically take a specified relationship also with the liquid crystal display, thereby eliminating the requirement of an angle adjustment every time.

By slanting the liquid crystal panel to the mirror Fresnel lens, the reflection image of a light source image displayed on the surface of the liquid crystal panel comes off the projection lens, a bright spot is no longer created on the screen.

Also by providing an antireflection layer on the surface of the liquid crystal panel, the occurrence of a spot-like bright portion otherwise created on the projection plane owing to the surface reflection from the liquid crystal panel can be effectively prevented.

What is claimed is:

1. A refection type overhead projector in which a mirror Fresnel lens reflects light from a light source, and an image on said mirror Fresnel lens is converged onto a projection lens spaced from said mirror Fresnel lens and projected in an enlarged manner and displayed on a screen, comprising:
    a transmission type liquid crystal display using an ECB type liquid crystal cell, said liquid crystal display being removably disposed on said mirror Fresnel lens and provided with a first polarization plate on only one side thereof in opposing relation to said mirror Fresnel lens; and
    a second polarization plate disposed adjacent said projection lens for effecting image formation in cooperation with said first polarization plate of said liquid crystal display.

2. A reflection type overhead projector in which a mirror Fresnel lens reflects light from a light source, and an image on said mirror Fresnel lens is converged onto a projection lens spaced from said mirror Fresnel lens and projected in an enlarged manner and displayed on a screen, comprising:
    a transmission type color liquid crystal display provided with a stripe-like color filter and with pixels of the liquid crystal display arranged in opposing relation to each stripe in the lengthwise direction thereof, said liquid crystal display being removably disposed on said mirror Fresnel lens and provided with a first polarization plate on only one side thereof in opposing relation to said mirror Fresnel lens; and a second polarization plate disposed adjacent said projection lens for effecting image formation in cooperation with said first polarization plate of said liquid crystal display.

3. The reflection type overhead projector of claim 2, wherein said color filter is longer than a display area of said color liquid crystal display in an extension direction of said stripe.

4. The reflection type overhead projector of claim 1 or 2, wherein said second polarization plate is held detachably by a holding means that can rotate substantially around a center axis of an optical axis of said projection lens.

5. The reflection type overhead projector of claim 4, wherein a housing portion to house said second polarization plate removed from said holding means is provided.

6. The reflection type overhead projector of claim 1 or 2 wherein a connecting means is provided to connect said liquid crystal display and said second polarization plate with each other to thereby hold the mutual positional relationship therebetween.

7. The reflection type overhead projector of claim 6, wherein said connecting means is of the assembled type.

8. The reflection type overhead projector of claim 6, wherein said connecting means includes an adjusting means for adjusting the mutual positional relationship of said liquid crystal display and said second polarization plate.

9. The reflection type overhead projector of claim 1 or 2, wherein an antireflection layer is formed on a surface of a liquid crystal panel of said liquid crystal display.

10. The reflection type overhead projector of claim 9, wherein:

said antireflection layer is formed on a transparent film which adheres to said liquid crystal panel, and an optical axis of said transparent film is substantially parallel to a transmission axis of said second polarization plate.

11. The reflection type liquid crystal overhead projector of claim 1 or 2, wherein:

an infrared ray eliminating filter to eliminate infrared rays is located in an optical path from said light source to said second polarization plate.

12. The reflection type overhead projector of claim 9 wherein said antireflection layer is formed on a transparent film which adheres to said liquid crystal panel, and an optical axis of said transparent film is substantially perpendicular to a transmission axis of said second polarization plate.

13. In a reflection type overhead projector in which a mirror Fresnel lens receives and reflects incident light from a light source, and an image formed by a liquid crystal display on said mirror Fresnel lens is converged onto a projection lens and projected on a screen, the improvement wherein:

a liquid crystal panel of said liquid crystal display is slanted toward said mirror Fresnel lens so that an image of said light source, reflected from a surface of said liquid crystal panel, is displaced from said projection lens.

14. A reflection type overhead projector in which a mirror Fresnel lens reflects light from a light source, and an image on said mirror Fresnel lens is converged onto a projection lens spaced from said mirror Fresnel lens and projected in an enlarged manner and displayed on a screen, comprising:

a transmission type liquid crystal display removably disposed on said mirror Fresnel lens and provided with a first polarization plate on only one side thereof in opposing relation to said mirror Fresnel lens; and a second polarization plate disposed adjacent said projection lens for effecting image formation in cooperation with said first polarization plate of said liquid crystal display;

a surface of a liquid crystal panel of said liquid crystal display being slanted toward said mirror Fresnel lens so that the image of said light source, reflected from a surface of said liquid crystal panel, is displaced from said projection lens.

* * * * *